March 25, 1930. G. KELL 1,752,183
TAIL SKID FOR AIRCRAFT
Filed Nov. 4, 1929 2 Sheets-Sheet 1
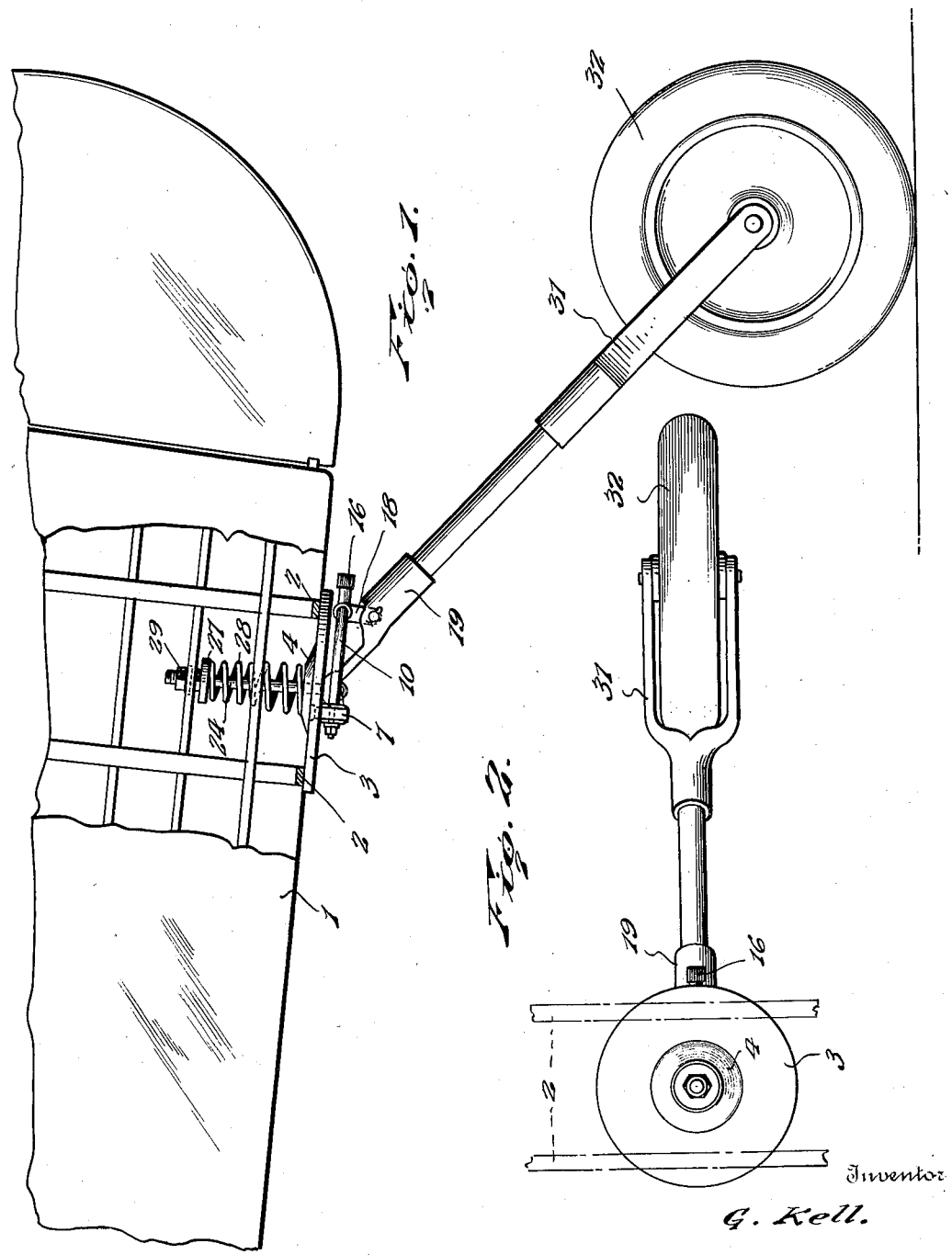

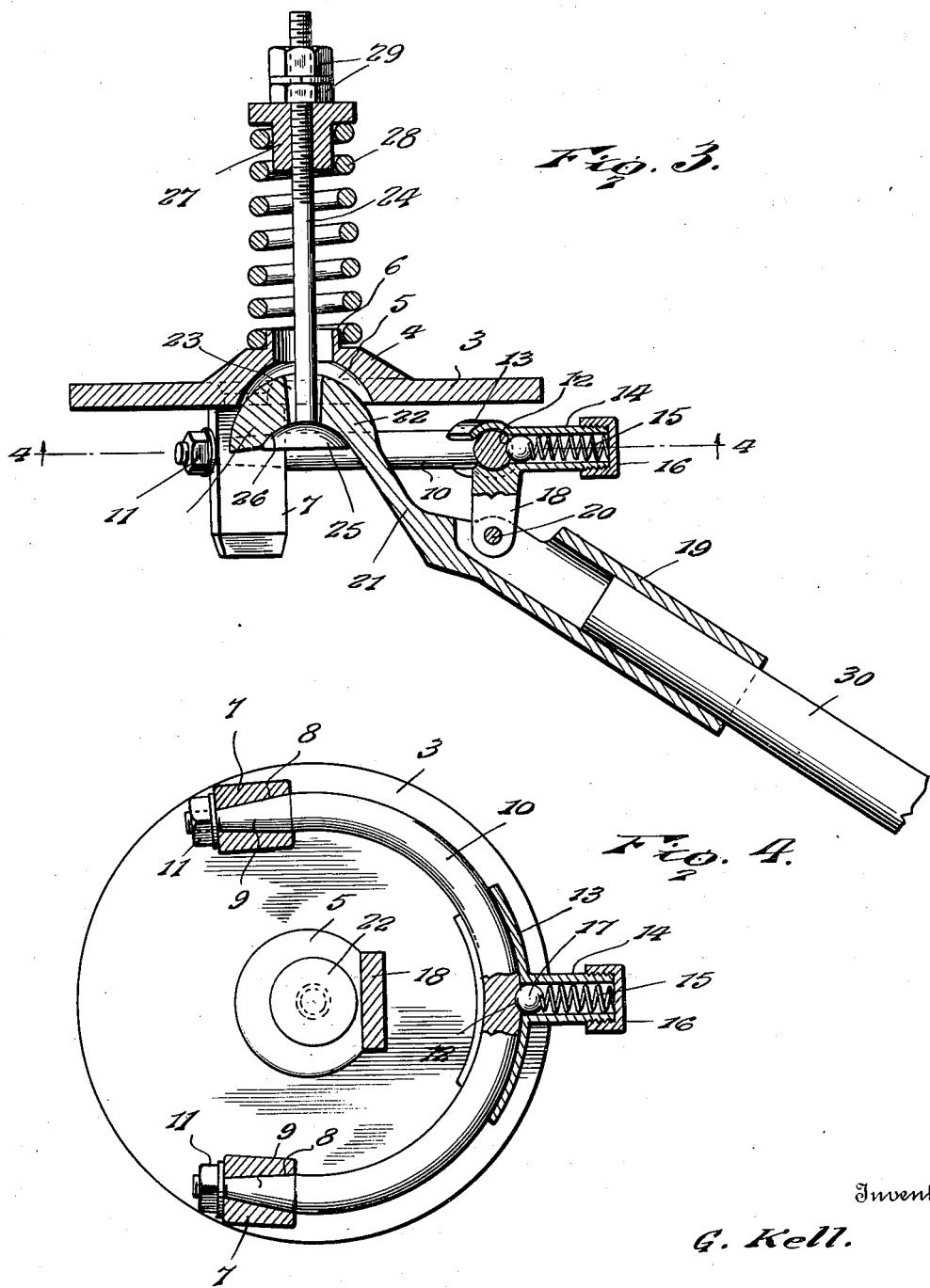

Patented Mar. 25, 1930

1,752,183

UNITED STATES PATENT OFFICE

GEORGE KELL, OF LOUISVILLE, OHIO

TAIL SKID FOR AIRCRAFT

Application filed November 4, 1929. Serial No. 404,711.

The present invention is directed to improvements in tail skids for air craft.

The primary object of the invention is to provide a device of this character so constructed that it can be conveniently applied to the tail of the fuselage and when in position thereon will effectively support the tail of the plane as well as absorb the shock when the tail approaches the ground in landing.

Another object of the invention is to provide a device of this character so constructed that the skid will be positively held in a line with the longitudinal axis of the fuselage at the time it lands, the construction being such that the skid can turn with respect to the fuselage as the plane is guided laterally.

Another object of the invention is to provide a device of this character which is exceedingly simple in construction, durable, efficient in operation, and one which can be manufactured at a minimum cost.

With these and other objects in view, this invention resides in the novel features of construction, formation, combination and arrangement of parts to be hereinafter more fully described, claimed and illustrated in the accompanying drawings, in which:

Figure 1 is a side elevation, with parts broken away, of the tail portion of an air craft, showing the skid in position thereon.

Figure 2 is a top plan view of the skid.

Figure 3 is a detail vertical sectional view through the device.

Figure 4 is a sectional view on the line 4—4 of Figure 3.

Referring to the drawings, 1 designates a portion of the tail of the fuselage of an air craft and 2 a pair of transverse bars carried thereby and to which is fixed a metallic disc 3, any appropriate means being employed for securing the disc to said bars. This disc is provided with a boss 4, said boss having a conical recess 5 in its under surface and being provided with a collar 6, the purpose of which will be later explained.

Formed integral with the under surface of the disc 3 is a pair of laterally spaced lugs 7, said lugs having tapered bearings 8 formed therein and in which are engaged the tapered ends 9 of the arcuate guide rod 10, there being clamping nuts 11 upon the tapered ends 9 to firmly secure the guide rod to the lugs. The rod 10 is provided at its center with a recess or seat 12, the purpose of which will appear later.

Slidable on the rod 10 is a sleeve 13 and extending rearwardly therefrom is a housing 14 in which is mounted a coil spring 15, said spring being retained within the housing by a removable cap 16. The spring 15 bears against a ball 17 which is adapted to engage the seat 12, as clearly shown in Figure 4 of the drawings. A sleeve 13 has formed integral therewith a depending arm 18 and to which is pivotally connected the head 19, the pivotal connection being obtained by passing a pin or bolt 20 through the head and arm. The forward end of the head 19 terminates in a neck 21 which, in turn, is provided with a semi-spherical head 22, said head being provided with a central opening 23.

A bolt 24 is employed and is engaged in the opening 23 and has its lower end provided with a head 25 adapted to engage in the recess 26 formed in the under surface of the head 22. The upper end of the bolt has adjustably mounted thereon a collar 27. The bolt 24 passes through the collar 6 and is encircled by a coil spring 28, the lower terminal of which encircles the collar 6 while the upper terminal thereof engages the collar 27, there being jam nuts threaded upon the bolt to prevent accidental rotation of the collar 27. Obviously, upon adjustment of the collar 27, the tension of the spring 28 can be conveniently regulated.

A bar 30 is provided and has its upper end fitted in the head 19, said bar having a fork 31 upon its lower end for rotatably supporting the wheel 32.

It will be obvious that when the plane is landing and the wheel 32 contacts with the ground, the head 19 will rock, due to its pivotal connection with the arm 18, whereupon the head 22 will be moved downwardly, and the thrust incident thereto will be absorbed by the spring 28. Owing to the presence of the ball 17, the wheel will be maintained in alinement with the longitudinal axis of the fuselage of the plane when it contacts with the ground but when the plane is guided either to the right or left, the ball 17 will disengage the seat 12 so that the wheel 31 can properly follow the plane in its movement during guiding thereof. It will, of course, be understood that the ball 17 will be engaged in the seat 12 when the plane takes off, so as to assure that the wheel will be in proper alinement when the plane lands.

From the foregoing it is thought that the operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What is claimed is:

1. The combination with the tail of an air craft, of a disc fixed thereto, an arcuate guide rod connected with the disc, a sleeve slidable on the guide rod, means for yieldably interlocking the sleeve with the guide rod, a head pivotally connected with the sleeve, means for yieldably connecting the head with the disc, and a ground engaging wheel connected with said head.

2. The combination with the tail of an air craft, of a disc fixed thereto, an arcuate guide rod connected with the disc, a sleeve slidable on the guide rod, means for yieldably interlocking the sleeve centrally of the guide rod, a head pivotally connected with the sleeve, a bolt passable through the disc and head, a spring encircling the bolt for yieldably connecting the head and disc, a second head, and a ground engaging wheel connected with the latter head.

3. The combination with the tail of an air craft, of a disc fixed thereto, lugs carried by the disc, an arcuate guide rod having its ends fixed in the lugs, a sleeve slidable on the guide rod, a head pivotally connected with the sleeve, a ground engaging wheel connected with the head, a neck carried by the head, said neck having a head thereon, a bolt passable through the disc and second named head, a coil spring encircling the bolt for yieldably connecting the second named head and disc, and means for regulating the tension of the spring.

4. The combination with the tail of an air craft, of a disc fixed thereto, lugs carried by the disc and having fixed therein the ends of an arcuate guide rod, said guide rod having a seat formed centrally thereof, a sleeve slidable on the guide rod, a housing carried by the sleeve, a ball mounted in the housing, a spring for yieldably holding the ball engaged in said seat, an arm carried by the sleeve, a head pivotally connected with the arm, a ground engaging wheel connected with the head, a neck carried by said head and having a head thereon, a bolt passable through the disc and second named head, a spring encircling the bolt and bearing upon the disc, means for regulating the tension of the spring, said spring serving to resist the movement of the second named head with respect to the disc.

In testimony whereof I affix my signature.

GEORGE KELL. [L. S.]